(12) United States Patent
Fournier et al.

(10) Patent No.: US 6,743,868 B2
(45) Date of Patent: Jun. 1, 2004

(54) POLYAMIDE BASED THERMOPLASTIC SILICONE ELASTOMERS

(75) Inventors: Frances Marie Fournier, Flint, MI (US); Richard Leroy Rabe, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 10/199,345

(22) Filed: Jul. 18, 2002

(65) Prior Publication Data
US 2004/0014888 A1 Jan. 22, 2004

(51) Int. Cl.[7] ............................................... C08G 77/08
(52) U.S. Cl. ....................... 525/431; 525/903; 524/730; 524/731; 524/862
(58) Field of Search ................................. 525/431, 903; 524/730, 731, 862

(56) References Cited

U.S. PATENT DOCUMENTS

| | | | |
|---|---|---|---|
| 3,419,593 A | 12/1968 | Willing | 260/448.2 |
| 4,692,486 A | 9/1987 | Gugumus | 524/100 |
| 5,175,325 A | 12/1992 | Brown et al. | 556/9 |
| 5,981,680 A | 11/1999 | Petroff et al. | 528/26 |
| 6,013,715 A | 1/2000 | Gornowicz et al. | 524/492 |
| 6,153,691 A | 11/2000 | Gornowicz et al. | 524/861 |
| 6,362,287 B1 | 3/2002 | Chorvath et al. | 525/431 |
| 6,362,288 B1 | 3/2002 | Brewer et al. | 525/431 |

*Primary Examiner*—Margaret G. Moore
(74) *Attorney, Agent, or Firm*—Alan Zombeck

(57) ABSTRACT

A method for making thermoplastic elastomeric compositions is disclosed wherein a polyamide, a silicone base, a stabilizer, and optional compatibilizer are first mixed, then a hydrosilation catalyst and subsequently an organohydrido silicon compound are added, and the silicone base is dynamically vulcanized.

12 Claims, No Drawings

POLYAMIDE BASED THERMOPLASTIC SILICONE ELASTOMERS

FIELD OF THE INVENTION

This invention relates to a method for making thermoplastic elastomeric compositions wherein a polyamide, a silicone base, a stabilizer, and optional compatibilizer are first mixed, then a hydrosilation catalyst and subsequently an organohydrido silicon compound are added, and the silicone base is dynamically vulcanized.

BACKGROUND OF THE INVENTION

Thermoplastic elastomers (TPEs) are polymeric materials, which possess both plastic and rubbery properties. They have elastomeric mechanical properties but, unlike conventional thermoset rubbers, they can be re-processed at elevated temperatures. This re-processability is a major advantage of TPEs over chemically crosslinked rubbers since it allows recycling of fabricated parts and results in a considerable reduction of scrap.

In general, two main types of thermoplastic elastomers are known. Block copolymer thermoplastic elastomers contain "hard" plastic segments, which have a melting point or glass transition temperature above ambient as well as "soft" polymeric segments which have a glass transition or melt point considerably below room temperature. In these systems, the hard segments aggregate to form distinct microphases and act as physical crosslinks for the soft phase, thereby imparting a rubbery character at room temperature. At elevated temperatures, the hard segments melt or soften and allow the copolymer to flow and to be processed like an ordinary thermoplastic resin.

Alternatively, a thermoplastic elastomer referred to as a simple blend (physical blend) can be obtained by uniformly mixing an elastomeric component with a thermoplastic resin. When the elastomeric component is also cross-linked during mixing, a thermoplastic elastomer known in the art as a thermoplastic vulcanizate (TPV) results. Since the crosslinked elastomeric phase of a TPV is insoluble and non-flowable at elevated temperature, TPVs generally exhibit improved oil and solvent resistance as well as reduced compression set relative to the simple blends.

Typically, a TPV is formed by a process known as dynamic vulcanization, wherein the elastomer and the thermoplastic matrix are mixed and the elastomer is cured with the aid of a crosslinking agent and/or catalyst during the mixing process. A number of such TPVs are known in the art, including some wherein the crosslinked elastomeric component can be a silicone polymer while the thermoplastic component is an organic, non-silicone polymer (i.e., a thermoplastic silicone vulcanizate or TPSiV). Representative examples of TPSiVs are disclosed in U.S. Pat. Nos. 6,013,715, 6,153,691, 6,362,287, and 6,362,288.

The present inventors have unexpectedly found an improved process for preparing polyamide (nylon) based TPSiVs. While U.S. Pat. Nos. 6,362,287, and 6,362,288 disclose polyamide based TPSiVs, the methods taught therein were limited to polyamides that were rheologically stable under mixing conditions. In particular, the methods of U.S. Pat. Nos. 6,362,287, and 6,362,288 were unsuccessful to prepare a TPSiV based on nylon 11. The present invention provides for an improved process for making polyamide TPSiVs and in particular provides a process for preparing nylon 11 based TPSiVs.

SUMMARY OF THE INVENTION

The present invention relates to a method for preparing a thermoplastic elastomer comprising:

(I) first mixing;
  (A) a polyamide resin having a melting point or glass transition temperature of 25° C. to 275° C.,
  (B) a silicone base comprising,
    (B') 100 parts by weight of a diorganopolysiloxane gum having a plasticity of at least 30 and having an average of at least 2 alkenyl radicals in its molecule and, optionally,
    (B") 5 to 200 parts by weight of a reinforcing filler, the weight ratio of the silicone base to the polyamide resin is from 35:65 to 85:15,
  (C) 0.1 to 5 parts by weight of a stabilizer for each 100 parts by weight of the polyamide and the silicone base, and optionally,
  (D) 0.1 to 10 parts of a compatibilizer for each 100 parts by weight of the polyamide resin,
then;
(II) adding
  (E) a hydrosilation catalyst,
and subsequently,
  (F) an organohydrido silicon compound which contains an average of at least 2 silicon-bonded hydrogen groups in its molecule and components (E) and (F) being present in an amount sufficient to cure the diorganopolysiloxane (B'); and
(III) dynamically curing the diorganopolysiloxane (B'),
wherein at least one property of the thermoplastic elastomer selected from tensile strength or elongation is at least 25% greater than the respective property for a corresponding simple blend wherein the diorganopolysiloxane is not cured.

DETAILED DESCRIPTION OF THE INVENTION

Component (A) of the present invention is a thermoplastic polyamide resin. These resins are well known by the generic term "nylon" and are long chain synthetic polymers containing amide (i.e., —C(O)—NH—) linkages along the main polymer chain. For the purposes of the present invention, the polyamide resin has a melt point (m.p.), or glass transition temperature ($T_g$) if the polyamide is amorphous, of room temperature (i.e., 25° C.) to 275° C. The polyamide resin of the present invention is typically dried by passing a dry, inert gas over pellets or powder of the polyamide resin at elevated temperatures. The degree of drying consistent with acceptable properties and processing depends on the particular polyamide and its value is generally recommended by the manufacturer or may be determined by a few simple experiments. It is generally preferred that the polyamide resin contains no more than about 0.1 weight percent of moisture. The polyamide resin, component (A), can be any thermoplastic crystalline or amorphous high molecular weight solid homopolymer, copolymer or terpolymer having recurring amide units within the polymer chain. In copolymer and terpolymer systems, more than 50 mole percent of the repeat units are amide-containing units. Examples of suitable polyamides are polylactams such as nylon 6, polyenantholactam (nylon 7), polycapryllactam (nylon 8), polylauryllactam (nylon 12), and the like; homopolymers of aminoacids such as polypyrrolidinone (nylon 4); copolyamides of dicarboxylic acid and diamine such as nylon 6/6, polyhexamethyleneazelamide (nylon 6/9), polyhexamethylene-sebacamide (nylon 6/10), polyhexamethyleneisophthalamide (nylon 6,I), polyhexamethylenedodecanoic acid (nylon 6/12) and the like; homopolymers of 11-aminoundecanoic acid (nylon 11), and copolymers thereof, polyaromatic and partially aromatic polyamides; copolyamides such as copolymers of caprolactam and hexamethyleneadipamide (nylon 6,6/6), or a terpolyamide (e.g., nylon 6,6/6,6); block copolymers such as polyether polyamides; or mixtures thereof. Typically, the polyamide resins are nylon 6, nylon 12, nylon 6/12 and nylon 6/6, or alternatively nylon 11. Silicone base (B) is a uniform blend of a diorganopolysiloxane gum (B') and a reinforcing filler (B").

Diorganopolysiloxane (B') is a high consistency (gum) polymer or copolymer which contains at least 2 alkenyl groups having 2 to 20 carbon atoms in its molecule. The alkenyl group is specifically exemplified by vinyl, allyl, butenyl, pentenyl, hexenyl and decenyl. The position of the alkenyl functionality is not critical and it may be bonded at the molecular chain terminals, in non-terminal positions on the molecular chain or at both positions. Typically, the alkenyl group is vinyl or hexenyl and that this group is present at a level of 0.001 to 3 weight percent, preferably 0.01 to 1 weight percent, in the diorganopolysiloxane gum.

The remaining (i.e., non-alkenyl) silicon-bonded organic groups in component (B') are independently selected from hydrocarbon or halogenated hydrocarbon groups which contain no aliphatic unsaturation. These may be specifically exemplified by alkyl groups having 1 to 20 carbon atoms, such as methyl, ethyl, propyl, butyl, pentyl and hexyl; cycloalkyl groups, such as cyclohexyl and cycloheptyl; aryl groups having 6 to 12 carbon atoms, such as phenyl, tolyl and xylyl; aralkyl groups having 7 to 20 carbon atoms, such as benzyl and phenethyl; and halogenated alkyl groups having 1 to 20 carbon atoms, such as 3,3,3-trifluoropropyl and chloromethyl. It will be understood, of course, that these groups are selected such that the diorganopolysiloxane gum (B') has a glass temperature (or melt point) which is below room temperature and the gum is therefore elastomeric. Methyl typically makes up at least 50, or alternatively at least 90, mole percent of the non-unsaturated silicon-bonded organic groups in component (B').

Thus, polydiorganosiloxane (B') can be a homopolymer or a copolymer containing such organic groups. Examples include gums comprising dimethylsiloxy units and phenylmethylsiloxy units; dimethylsiloxy units and diphenylsiloxy units; and dimethylsiloxy units, diphenylsiloxy units and phenylmethylsiloxy units, among others. The molecular structure is also not critical and is exemplified by straight-chain and partially branched straight-chain, linear structures being typical.

Specific illustrations of organopolysiloxane (B') include: trimethylsiloxy-endblocked dimethylsiloxane-methylhexenylsiloxane copolymers; dimethylhexenlylsiloxy-endblocked dimethylsiloxane-methylhexenylsiloxane copolymers; trimethylsiloxy-endblocked dimethylsiloxane-methylvinylsiloxane copolymers; trimethylsiloxy-endblocked methylphenylsiloxane-dimethylsiloxane-methylvinylsiloxane copolymers; dimethylvinylsiloxy-endblocked dimethylpolysiloxanes; dimethylvinylsiloxy-endblocked dimethylsiloxane-methylvinylsiloxane copolymers; dimethylvinylsiloxy-endblocked methylphenylpolysiloxanes; dimethylvinylsiloxy-endblocked methylphenylsiloxane-dimethylsiloxane-methylvinylsiloxane copolymers; and similar copolymers wherein at least one end group is dimethylhydroxysiloxy. Typical systems for low temperature applications include methylphenylsiloxane-dimethylsiloxane-methylvinylsiloxane copolymers and diphenylsiloxane-dimethylsiloxane-methylvinylsiloxane copolymers, particularly wherein the molar content of the dimethylsiloxane units is about 93%.

Component (B') may also consist of combinations of two or more organopolysiloxanes. Typically, component (B') is a polydimethylsiloxane homopolymer which is terminated with a vinyl group at each end of its molecule or is such a homopolymer which also contains at least one vinyl group along its main chain.

For the purposes of the present invention, the molecular weight of the diorganopolysiloxane gum is sufficient to impart a Williams plasticity number of at least about 30 as determined by the American Society for Testing and Materials (ASTM) test method 926. The plasticity number, as used herein, is defined as the thickness in millimeters×100 of a cylindrical test specimen 2 $cm^3$ in volume and approximately 10 mm in height after the specimen has been subjected to a compressive load of 49 Newtons for three minutes at 25° C. When the plasticity of this component is less than about 30, as in the case of the low viscosity fluid siloxanes employed by Arkles, cited supra, the TPSiVs prepared by dynamic vulcanization according to the instant method exhibit poor uniformity such that at high silicone contents (e.g., 50 to 70 weight percent) there are regions of essentially only silicone and those of essentially only thermoplastic resin, and the blends are weak and friable. The gums of the present invention are considerably more viscous than the silicone fluids employed in the prior art. For example, silicones contemplated by Arkles, cited supra, have an upper viscosity limit of 100,000 cS (0.1 $m^2/s$) and, although the plasticity of fluids of such low viscosity are not readily measured by the ASTM D 926 procedure, it was determined that this corresponds to a plasticity of approximately 24. Although there is no absolute upper limit on the plasticity of component (B'), practical considerations of processability in conventional mixing equipment generally restrict this value. Typically, the plasticity number should be 100 to 200, or altenatively 120 to 185.

Methods for preparing high consistency unsaturated group-containing polydiorganosiloxanes are well known and they do not require a detailed discussion in this specification. For example, a typical method for preparing an alkenyl-functional polymer comprises the base-catalyzed equilibration of cyclic and/or linear diorganopolysiloxanes in the presence of similar alkenyl-functional species.

Optional component (B") is a finely divided filler which is known to reinforce diorganopolysiloxane (B') and is preferably selected from finely divided, heat stable minerals such as fumed and precipitated forms of silica, silica aerogels and titanium dioxide having a specific surface area of at least about 50 $m^2$/gram. The fumed form of silica is a preferred reinforcing filler based on its high surface area, which can be up to 450 $m^2$/gram and a fumed silica having a surface area of 50 to 400 $m^2/g$, most preferably 200 to 380 $m^2/g$, is highly preferred. Typically, the fumed silica filler is treated to render its surface hydrophobic, as commonly practiced in the silicone rubber art. This can be accomplished by reacting the silica with a liquid organosilicon compound which contains silanol groups or hydrolyzable precursors of silanol groups. Compounds that can be used as filler treating agents, also referred to as anti-creeping agents or plasticizers in the silicone rubber art, include such ingredients as low molecular weight liquid hydroxy- or alkoxy-terminated polydiorganosiloxanes, hexaorganodisiloxanes, cyclodimethylsilazanes and hexaorganodisilazanes. Typically, the treating compound is an oligomeric hydroxy-terminated diorganopolysiloxane having an average degree of polymerization (DP) of 2 to 100, or alternatively 2 to 10 and it is used at a level of about 5 to 50 parts by weight for each 100 parts by weight of the silica filler. When component (B') is the vinyl-functional or hexenyl-functional polydimethylsiloxane, this treating agent is typically a hydroxy-terminated polydimethylsiloxane.

For the purposes of the present invention, 5 to 200 parts by weight, typically 5 to 150 or alternatively 20 to 100 parts by weight, of the reinforcing filler (B") are uniformly blended with 100 parts by weight of gum (B') to prepare silicone base (B). This blending is typically carried out at room temperature using a two-roll mill, internal mixer or other suitable device, as well known in the silicone rubber art. Alternatively, the silicone base can be formed in-situ during mixing prior to dynamic vulcanization of the gum, as further described infra. In the latter case, the temperature of mixing is kept below the softening point or melting point of the polyamide resin until the reinforcing filler is well dispersed in the diorganopolysiloxane gum.

Component (C) is a stabilizer in the formulation of the present invention. Stabilizer (C) is at least one organic compound selected from hindered phenols; thioesters; hindered amines; 2,2'-(1,4-phenylene)bis(4H-3,1-benzoxazin-4-one); or 3,5-di-tert-butyl-4-hydroxybenzoic acid, hexadecyl ester.

For the purposes of the present invention, a hindered phenol is an organic compound having at least one group of the formula

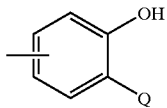

(i)

in its molecule, wherein Q is a monovalent organic group having 1 to 24 carbon atoms selected from hydrocarbon groups, hydrocarbon groups which optionally contain heteroatoms selected from sulfur, nitrogen or oxygen or halogen-substituted versions of the aforementioned groups. Examples of Q include groups such as alkyl, aryl, alkylaryl, arylalkyl, cycloalkyl and halogen-substituted version thereof; alkoxy groups having 1 to 24 carbon atoms, such as methoxy or t-butoxy; and hydrocarbon groups having 2 to 24 carbon atoms which contain heteroatoms (e.g., —CH$_2$—S—R", —CH$_2$—O—R" or —CH$_2$—C(O)OR", wherein R" is a hydrocarbon group having 1 to 18 carbon atoms). Further, although not explicitly shown in formula (i), it is also contemplated that the benzene ring may additionally be substituted with one or more of the above described Q groups. The residue of the organic compound to which group (i) is chemically bonded is not critical as long as it does not contain moieties which would interfere with the dynamic vulcanization, described infra. For example, this residue may be a hydrocarbon, a substituted hydrocarbon or a hetero atom-containing hydrocarbon group of the appropriate valence. It is also contemplated that the group according to formula (i) can be attached to hydrogen to form an organophenol. Typically, the hindered phenol compound has a number average molecular weight of less than about 3,000.

A typical hindered phenol compound contains at least one group of the formula

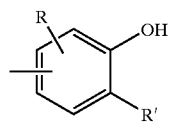

(ii)

in its molecule wherein the benzene ring may be optionally further substituted with hydrocarbon groups having 1 to 24 carbon atoms. In formula (ii), R is an alkyl group having one to four carbon atoms and R' is a hydrocarbon group having 4 to 8 carbon atoms.

Typically, one to four of the groups shown in structures (i) or (ii) are attached to an organic residue of appropriate valence such that the contemplated compound has a molecular weight (MW) of less than about 1,500. Alternatively, four such groups are present in component (C) and this compound has a molecular weight of less than about 1,200. This monovalent (or polyvalent) organic residue can contain one or more heteroatoms such as oxygen, nitrogen, phosphorous and sulfur. The R' groups in the above formula may be illustrated by t-butyl, t-pentyl, n-pentyl, butenyl, hexenyl, cyclopentyl, cyclohexyl and phenyl. Typically, both R and R' are t-butyl. For the purposes of the present invention, a group according to formula (ii) can also be attached to hydrogen to form a diorganophenol.

Non-limiting specific examples of suitable hindered phenols include 1,1,3-Tris(2'-methyl-4'-hydroxy-5'-t-butylphenyl)butane, N,N'-hexamethylene bis(3-(3,5-di-t-butyl-4-hydroxyphenyl)propionamide), 4,4'-thiobis(2-t-butyl-5-methylphenol), 1,3,5-tris(4-tert-butyl-3-hydroxy-2,6-dimethyl benzyl)-1,3,5-triazine-2,4,6-(1H,3H,5H)-trione, N,N'-hexamethylenebis(3,5-di-tert-butyl-4-hydroxyhydrocinnamamide), tetrakis(methylene(3,5-di-tert-butyl-4-hydroxy-hydrocinnamate))methane, 1,3,5-trimethyl-2,4,6-tris (3,5-di-tert-butyl-4-hydroxybenzyl) benzene, 4,4'-methylenebis (2,6-di-tertiary-butylphenol), 2,2'-thiobis(6-tert-butyl-4-methylphenol), 2,2'-thiobis(4-octylphenol), 4,4'-thiobis(6-tert-butyl-2-methylphenol), 4,4'-thiobis(3,6-di-sec-amylphenol), 2-(4,6-bis(2,4-dimethylphenyl)-1,3,5,-triazin-2-yl)-5-(octyloxy) phenol, 2,4-bisoctylmercapto-6-(3,5-di-tert-butyl-4-hydroxyanilino)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl) isocyanurate, 1,3,5-tris(4-tert-butyl-3-hydroxy-2,6-dimethylbenzyl) isocyanurate, 2,6-di-tert-butyl-4-methoxyphenol, 2,5-di-tert-butylhydroquinone, 2,5-di-tert-amylhydroquinone, 2,6-di-tert-butylhydroquinone, 2,5-di-tert-butyl-4-hydroxyanisole, 2,6-diphenyl-4-octadecyloxyphenol, 3,5-di-tert-butyl-4-hydroxyanisole, 3,5-di-tert-butyl-4-hydroxyphenyl stearate, bis(3,5-di-tert-butyl-4-hydroxyphenyl) adipate, esters of beta-(3,5-di-tert-butyl-4-hydroxyphenyl)propionic acid with mono- or polyhydric alcohols (e.g., methanol, ethanol, n-octanol, trimethylhexanediol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, trimethylolpropane, tris(hydroxyethyl) isocyanurate, N,N'-bis(hydroxyethyl)oxalamide, 3-thiaundecanol, 3-thiapentadecanol, 4-hydroxymethyl-1-phospha-2,6,7-trioxabicyclo(2.2.2) octane and esters of beta-(5-tert-butyl-4-hydroxy-3-methylphenyl)propionic acid with mono- or polyhydric alcohols (as above).

Thioesters suitable as stabilizers in the present invention are compounds having at least one group of the formula

  (iii)

wherein G is —CH$_2$—CH$_2$—C(O)OR''' and R''' is a monovalent hydrocarbon group having 1 to 24 carbon atoms. Specific non-limiting examples of suitable thioesters include distearyl 3,3'-thiodipropionate, dilauryl-3,3'-thiodipropionate and di(tridecyl)3,3'-thiodipropionate.

The hindered amines useful as stabilizers in the present invention are low molecular weight organic compounds or a polymers containing at least one divalent group of the formula

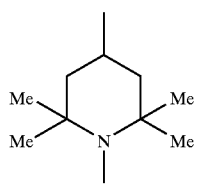  (iv)

wherein Me hereinafter denotes a methyl group. The backbone of this component is not critical as long as it does not contain functionality which would interfere with the dynamic vulcanization of the silicone gum and it may be illustrated by low-molecular and polymeric polyalkylpiperidines, as disclosed in U.S. Pat. No. 4,692,486, hereby incorporated by reference. Typically, the above group has the structure

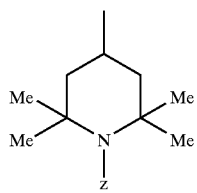  (v)

wherein Z is selected from hydrogen or an alkyl group having 1 to 24 carbon atoms, preferably hydrogen.

Specific non-limiting examples of suitable hindered amines include: 1,6-hexanediamine, N,N'-bis(2,2,6,6-pentamethyl-4-piperidinyl)-, polymers with morpholine-2,4,6-trichloro-1,3,5-triazine; 1,3-benzendicarboxamide, N,N'-bis(2,2,6,6-tetramethyl-4-piperidinyl), polymers with 2,4-Dichloro-6-(4-morpholinyl)-1,3,5-triazine; bis(1,2,2,6,6-pentamethyl-4-piperidinyl) sebacate; bis(2,2,6,6-tetramethyl-4-piperidinyl) sebacate; dimethyl succinate polymer with 4-hydroxy-2,2,6,6-tetramethyl-1-piperidine ethanol; and polymethyl (propyl-3-oxy-(2',2',6',6'-tetramethyl-4'-piperidinyl) siloxane.

Typical stabilizers of the invention are tetrakis(methylene (3,5-di-tert-butyl-4-hydroxy-hydrocinnamate))methane. N,N'-hexamethylenebis(3,5-di-tert-butyl-4-hydroxyhydrocinnamamide) and 1,1,3-tris(2'-methyl-4'-hydroxy-5'-t-butylphenyl)butane, 1,3,5-tris(4-tert-butyl-3-hydroxy-2,6-dimethylbenzyl)-1,3,5-triazine-2,4,6-(1H,3H,5H)-trione, and dilauryl-3,3'-thiodipropionate.

Non-limiting specific examples of component (C) include various hindered phenols marketed by Ciba Specialty Chemicals Corporation under the trade name Irganox™: Irganox™ 1076=octadecyl 3,5-di-tert-butyl-4-hydroxyhydrocinnamate, Irganox™ 1035=thiodiethylene bis(3,5-di-tert-butyl-4-hydroxyhydrocinnamate), Irganox™ MD1024=1,2-bis(3,5-di-tert-butyl-4-hydroxyhydrocinnamoyl)hydrazine, Irganox™ 1330=1,3,5-trimethyl-2,4,6-tris(3,5-di-tert-butyl-4-hydroxybenzyl)benzene, Irganox™ 1425 WL=calcium bis(monoethyl(3,5-di-tert-butyl-4-hydroxybenzyl)phosphonate) and Irganox™ 3114=1,3,5-tris-(3,5-di-tert-butyl-4-hydroxybenzyl)-1,3,5-triazine-2,4,6(1H,3H,5H)-trione.

Typical hindered phenols are Irganox™ 245 {triethyleneglycol bis (3-(3'-tert-butyl-4'-hydroxy-5'-methylphenyl) propionate)}, Irganox™ 1098 {N,N'-hexamethylenebis(3,5-di-tert-butyl-4-hydroxyhydrocinnamamide)} and Irganox™ 1010 {tetrakis(methylene(3,5-di-tert-butyl-4-hydroxyhydrocinnamate))methane}.

From 0.01 to 5 parts by weight of stabilizer (C) are typically employed for each 100 parts by weight of polyamide (A) plus silicone base (B). Alternatively, 0.1 to 0.75 parts by weight, or alternatively 0.475 to 0.525 parts by weight, of (C) are added for each 100 parts by weight of (A) plus (B).

Optional component (D) is a compatibilizer which may be a coupling agent, an organofunctional diorganopolysiloxane or a siloxane copolymer.

In one embodiment, the compatibilizer is (i) a coupling agent having a molecular weight of less than 800 which contains at least two groups in its molecule which are independently selected from ethylenically unsaturated groups (e.g., vinyl, allyl, butenyl, pentenyl, hexenyl, acrylate and methacrylate), epoxy, anhydride, silanol, hydroxyl, alkoxy having 1 to 20, preferably from 1 to 10, more preferably from 1 to 4, carbon atoms, carboxyl or oxazoline. The latter group has the structure

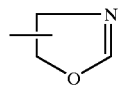

wherein the carbon atoms of the ring may contain one or more substituents selected from hydrocarbon groups having 1 to 4 carbon atoms. The coupling agent can have an organic or siloxane-based skeletal structure as long as it contains at least two of the above mentioned groups, these being located at terminal positions, along the backbone or both. In the case of siloxane backbones, the above mentioned functional organic groups (i.e., non-silanol) are attached to silicon atoms via Si—C bonds (e.g., through a divalent hydrocarbon group such as trimethylene, tetramethylene and dimethylene) or a divalent organic group containing oxygen and/or nitrogen heteroatoms, such as ester, ether or amide. Although the groups may be the same, typically at least one of these is an ethylenically unsaturated group, such as vinyl, while at least one other group is selected from the above mentioned epoxy, anhydride, alkoxy, silanol, hydroxyl, carboxyl or oxazoline groups.

Examples of suitable coupling agents include allyl glycidyl ether, glycidyl methacrylate, 1,2-epoxy-7-octene, 1,2-epoxy-9-decene, 1,2-epoxy-5-hexene, allyl succinic anhydride, vinyloxazolines, vinyloxazoline derivatives such as 2-isopropenyl-2-oxazoline, gamma-glycidoxypropylmethyldimethoxysilane, gamma-glycidoxypyltrimethoxysilane, beta-(3,4-epoxycyclohexyl)ethyltrimethoxysilane, 1,3-phenylene-bis (2-oxazoline), poly(propylene glycol) diglycidyl ether, diglycidyl ether of bisphenol A, tris(2,3-epoxypropy) isocyanurate and unsaturated diamides such as $CH_2=CH-(CH_2)_8-CO-NH-(CH_2)_6-NH-CO-(CH_2)_8-CH=CH_2$, inter alia.

The concentration of these coupling agents can be from 0.1 to 5 parts by weight for each 100 parts by weight of the polyamide (A), typically from 0.2 to 3 parts by weight.

In another embodiment, the compatibilizer is (ii) a functional diorganopolysiloxane having a number average molecular weight of at least 800, typically 800 to 50,000, or alternatively from 800 to 15,000. The functional diorganopolysiloxane (ii) is a polymer or copolymer in which the organic groups are independently selected from hydrocarbon or halogenated hydrocarbon groups which contain no aliphatic unsaturation, as described above for component (B'). However, at least one functional group selected from epoxy, anhydride, silanol, alkoxy having 1 to 20, typically from 1 to 10, or alternatively from 1 to 4, carbon atoms, amine, carboxyl or oxazoline, as described above, must be present in this polymer or copolymer.

Examples of suitable component (ii) include epoxy-functional polydimethylsiloxanes, such as mono (2,3-epoxy) propylether-terminated polydimethylsiloxane, epoxypropoxypropyl-terminated polydimethylsiloxane, (epoxycyclohexylethyl)methylsiloxane-dimethylsiloxane copolymers, and (epoxypropoxypropyl)methylsiloxane-dimethylsiloxane copolymers; amine-functional polydimethylsiloxanes, such as aminopropyl-terminated polydimethylsiloxane, aminoethylaminopropyl-terminated polydimethylsiloxane, aminopropyl-grafted polydimethylsiloxane, aminoethylaminopropyl-grafted polydimethylsiloxane; polydimethylsiloxanes containing anhydride groups, such as succinic anhydride-terminated polydimethylsiloxane and succinic anhydride-grafted polydimethylsiloxane; silanol-terminated polydimethylsiloxanes; polydimethylsiloxanes containing carboxyl groups, such as (mono)carboxydecyl-terminated polydimethylsiloxane and carboxydecyl-terminated polydimethylsiloxane; and polydimethylsiloxanes containing oxazoline groups, such as vinylxoazoline grafted polydimethylsiloxane.

The concentration of the functional diorganopolysiloxane can be from 0.5 to 10 parts by weight for each 100 parts by weight of the polyamide (A), or alternatively, from 0.5 to 5 parts by weight.

In the case of compatibilizers (i) and (ii), it is sometimes preferred to mix the compatibilizer with the polyamide resin at a temperature above the melt point of the resin prior to addition of the silicone base. While not wishing to be held to any theory or mechanism, it is believed that this procedure results in a reaction between the functional groups of the compatibilizer and either the amide or end groups of the resin, thereby maximizing compatibilization efficiency. Alternatively, it is sometimes advantageous to add the compatibilizer to a mixture of the polyamide and the silicone base. In any event, the preferred technique can be readily determined by routine experimentation.

In yet another embodiment, the compatibilizer is (iii) a block or graft copolymer comprising at least one diorganopolysiloxane block and at least one block selected from polyamide, polyether, polyurethane, polyurea, polycarbonate or polyacrylate. For example, copolymer (iii) can have a structure such as AB, (AB)$_n$, ABA, BAB, A-g-B and B-g-A, wherein n is an integer having a value greater than 1, A represents a diorganopolysiloxane block and B represents one of the above mentioned organic blocks. The diorganopolysiloxane block is a polymer or copolymer in which all of the organic groups are independently selected from hydrocarbon or halogenated hydrocarbon groups which contain no aliphatic unsaturation, these groups being previously described in connection with component (B'). Thus, for example, this component can be selected from diorganopolysiloxane-polyether block or graft copolymers, diorganopolysiloxane-polyamide block or graft copolymers, diorganopolysiloxane-polyurethane block or graft copolymers, diorganopolysiloxane-polyurea block or graft copolymers, diorganopolysiloxane-polycarbonate block or graft copolymers, diorganopolysiloxane-polyacrylate block or graft copolymers or diorganopolysiloxane-polymethacrylate block or graft copolymers, wherein the diorganopolysiloxane is typically a polydimethylsiloxane block. Typically, the number average molecular weight of copolymer (iii) is 1,500 to 50,000, or alternatively 2,000 to 20,000.

Examples of copolymer (iii) include polyamide-polydimethylsiloxane copolymers, such as the siloxane-based polyamides prepared by reacting an SiH-functional dimethylsiloxane and a reaction product of an olefinic acid with a diamine (as described in U.S. Pat. No. 5,981,680 to Petroff et al.); copolymers prepared by reacting α,ω-bis (aminoalkyl)polydimethylsiloxane and hydroxy-terminated polyamide prepolymers having a molecular weight of 1,500 to 3,000; copolymers prepared by reacting α,ω-bis (aminoalkyl)-functional polydimethylsiloxane an aromatic, aliphatic or cycloaliphatic diisocyanates having an average molecular weight of, e.g., 1,500 to 3,000; and copolymers of poly(alkylene oxide) and polydimethylsiloxane, such as poly(ethylene oxide)-polydimethylsiloxane-poly(ethylene oxide) block copolymers and poly(propylene oxide)-polydimethylsiloxane-poly(propylene oxide) block copolymers, as well as graft copolymers of such systems.

The concentration of these copolymers can be from 0.5 to 10 parts by weight for each 100 parts by weight of polyamide (A), or alternatively from 0.5 to 5 parts by weight.

Component (E) is a hydrosilation catalyst that accelerates the cure of diorganopolysiloxane (B') in the present composition. This hydrosilation catalyst is exemplified by platinum catalysts, such as platinum black, platinum supported on silica, platinum supported on carbon, chloroplatinic acid, alcohol solutions of chloroplatinic acid, platinum/olefin complexes, platinum/alkenylsiloxane complexes, platinum/beta-diketone complexes, platinum/phosphine complexes and the like; rhodium catalysts, such as rhodium chloride and rhodium chloride/di(n-butyl)sulfide complex and the like; and palladium catalysts, such as palladium on carbon, palladium chloride and the like. Component (E) is typically a platinum-based catalyst such as chloroplatinic acid; platinum dichloride; platinum tetrachloride; a platinum complex catalyst produced by reacting chloroplatinic acid and divinyltetramethyldisiloxane which is diluted with dimethylvinylsiloxy endblocked polydimethylsiloxane, prepared according to U.S. Pat. No. 3,419,593 to Willing; and a neutralized complex of platinous chloride and divinyltetramethyldisiloxane, prepared according to U.S. Pat. No. 5,175,325 to Brown et al.

Component (E) is added to the present composition in a catalytic quantity sufficient to promote the reaction of components (B') and (F) and thereby cure the diorganopolysiloxane to form an elastomer. The catalyst is typically added so as to provide about 0.1 to 500 parts per million (ppm) of metal atoms based on the total weight of the thermoplastic elastomer composition, or alternatively 0.25 to 100 ppm.

The organohydrido silicon compound (F) is a crosslinker (cure agent) for diorganopolysiloxane (B') of the present composition and is an organopolysiloxane which contains at least 2 silicon-bonded hydrogen atoms in each molecule, but having at least about 0.1 weight percent hydrogen, preferably 0.2 to 2 and most preferably 0.5 to 1.7, percent hydrogen bonded to silicon. These SiH-functional materials are well known in the art and many of them are commercially available. Those skilled in the art will, of course, appreciate that either component (B') or component (F), or both, must have a functionality greater than 2 if diorganopolysiloxane (B') is to be cured (i.e., the sum of these functionalities must be greater than 4 on average). The position of the silicon-bonded hydrogen in component (F) is not critical, and it may be bonded at the molecular chain terminals, in non-terminal positions along the molecular chain or at both positions. The silicon-bonded organic groups of component (F) are independently selected from any of the (non-alkenyl) hydrocarbon or halogenated hydrocarbon groups described above in connection with diorganopolysiloxane (B'), including preferred embodiments thereof. The molecular structure of component (F) is also not critical and is exemplified by straight-chain, partially branched straight-chain, branched, cyclic and network structures, linear polymers or copolymers being preferred, this component should be compatible with diorganopolysiloxane (B') (i.e., it is effective in curing component (B')).

Component (F) is exemplified by the following: low molecular siloxanes, such as $PhSi(OSiMe_2H)_3$; trimethylsiloxy-endblocked methylhydridopolysiloxanes; trimethylsiloxy-endblocked dimethylsiloxane-methylhydridosiloxane copolymers; dimethylhydridosiloxy-endblocked dimethylpolysiloxanes; dimethylhydrogensiloxy-endblocked methylhydrogenpolysiloxanes; dimethylhydridosiloxy-endblocked dimethylsiloxane-methylhydridosiloxane copolymers; cyclic methylhydrogenpolysiloxanes; cyclic dimethylsiloxane-methylhydridosiloxane copolymers; tetrakis(dimethylhydrogensiloxy)silane; silicone resins composed of $(CH_3)_2HSiO_{1/2}$, $(CH_3)_3SiO_{1/2}$, and $SiO_{4/2}$ units; and silicone resins composed of $(CH_3)_2HSiO_{1/2}$, $(CH_3)_3SiO_{1/2}$, $CH_3SiO_{3/2}$, $PhSiO_{3/2}$ and $SiO_{4/2}$ units, wherein Me and Ph hereinafter denote methyl and phenyl groups, respectively.

Particularly preferred organohydrido silicon compounds are polymers or copolymers comprising RHSiO units ended with either $R_3SiO_{1/2}$ or $HR_2SiO_{1/2}$, wherein R is independently selected from alkyl groups having 1 to 20 carbon atoms, phenyl or trifluoropropyl, preferably methyl. It is also preferred that the viscosity of component (D) is about 0.5 to 1,000 mPa-s at 25° C., preferably 2 to 500 mPa-s. Further, this component preferably has 0.5 to 1.7 weight percent hydrogen bonded to silicon. It is highly preferred that component (F) is selected from a polymer consisting essentially of methylhydridosiloxane units or a copolymer consisting essentially of dimethylsiloxane units and methylhydridosiloxane units, having 0.5 to 1.7 percent hydrogen bonded to silicon and having a viscosity of 2 to 500 mPa-s at 25° C. It is understood that such a highly preferred system will have terminal groups selected from trimethylsiloxy or dimethylhdridosiloxy groups.

Component (F) may also be a combination of two or more of the above described systems. The organohydrido silicon compound (F) is used at a level such that the molar ratio of SiH therein to Si-alkenyl in component (B') is greater than 1 and preferably below about 50, more preferably 3 to 30, most preferably 4 to 20.

In addition to the above-mentioned components, a minor amount of an optional additive (G) can be incorporated in the compositions of the present invention. Preferably, this optional component is added at a level of 0.5 to 40 weight percent based on the total composition, more preferably 0.5 to 20 weight percent. This optional additive can be illustrated by, but not limited to, reinforcing fillers for polyamide resins, such as glass fibers and carbon fibers; extending fillers, such as quartz, barium sulfate, calcium carbonate, and diatomaceous earth; pigments, such as iron oxide and titanium oxide; electrically conducting fillers, such as carbon black and finely divided metals; heat stabilizers, such as hydrated cerric oxide; antioxidants; flame retardants, such as halogenated hydrocarbons, alumina trihydrate, magnesium hydroxide and organophosphorous compounds; and other fire retardant (FR) materials. A preferred FR additive is calcium silicate particulate, preferably a wollastonite having an average particle size of 2 to 30 μm. Further, optional component (G) can be a plasticizers for the silicone gum component, such as polydimethylsiloxane oil, and/or a plasticizer for the polyamide component. Examples of the latter include phthalate esters such as dicyclohexyl phthalate, dimethyl phthalate, dioctyl phthalate, butyl benzyl phthalate and benzyl phthalate; trimellitate esters such as $C_1$–$C_9$ alkyl trimellitate; sulfonamides such as N-cyclohexyl-p-toluenesulfonamide, N-ethyl-o,p-toluenesulfonamide and o-toluenesulfonamide, and liquid oligomeric plasticizers. Preferred plasticizers are liquids of low volatility which minimize emissions of plasticizer at the common melt temperatures of polyamides.

The above additives are typically added to the final thermoplastic composition after dynamic cure, but they may also be added at any point in the preparation provided they do not interfere with the dynamic vulcanization mechanism. Of course, the above additional ingredients are only used at levels which do not significantly detract from the desired properties of the final composition.

According to the method of the present invention, the thermoplastic elastomer is prepared by thoroughly dispersing silicone base (B) and stabilizer (C) in polyamide (A) and dynamically vulcanizing the diorganopolysiloxane in the base using organohydrido silicon compound (F) and catalyst (E). For the purposes of the present invention, the weight ratio of silicone base (B) to polyamide resin (A) is greater than 35:65. It has been found that when this ratio is 35:65 or less, the resulting vulcanizate generally has a modulus more resembling the polyamide resin than a thermoplastic elastomer. On the other hand, the above mentioned ratio should be no more than about 85:15 since the compositions tend to be weak and resemble cured silicone elastomers above this value. Notwithstanding this upper limit, the maximum ratio of (B) to (A) for any given combination of components is also limited by processability considerations since too high a silicone base content results in at least a partially crosslinked continuous phase which is no longer thermoplastic. For the purposes of the present invention, this practical limit is readily determined by routine experimentation and represents the highest level of component (B) which allows the TPSiV to be compression molded. It is, however, preferred that the final thermoplastic elastomer can also be readily processed in other conventional plastic operations, such as injection molding and extrusion and, in this case, the weight ratio of components (B) to (A) should be no more than about 75:25. Such a preferred thermoplastic elastomer which is subsequently re-processed often has a tensile strength and elongation which are within 10% of the corresponding values for the original TPSiV (i.e., the thermoplastic elastomer is little changed by re-processing). Although the amount of silicone base consistent with the above mentioned requirements depends upon the particular polyamide resin and other components selected, it is preferred that the weight ratio of components (B) to (A) is 40:60 to 75:25, more preferably 40:60 to 70:30.

Mixing is carried out in any device which is capable of uniformly dispersing the components in the polyamide resin, such as an internal mixer or a twin-screw extruder, the latter being preferred for commercial preparations. The temperature is preferably kept as low as practical consistent with good mixing so as not to degrade the resin. Depending upon the particular system, order of mixing of components (A), (B) and (C) in the first step of the process is generally not critical and, for example, components (A), (B), (C) and, optionally (D), are mixed at a temperature above the softening point (i.e., melt point or glass temperature) of (A), subsequently catalyst (E) then component (F) are introduced to initiate dynamic vulcanization. However, components (B) through (D) should be well dispersed in resin (A) before dynamic vulcanization begins. As previously mentioned, it is also contemplated that the silicone base can be formed in-situ. For example, the reinforcing filler may be added to a mixer already containing the polyamide resin and diorganopolysiloxane gum at a temperature below the softening point of the resin to thoroughly disperse the filler in the gum. The temperature is then raised to melt the resin, the other ingredients are added and mixing/dynamic vulcanization are carried out. Optimum temperatures, mixing times and other conditions of the mixing operation depend upon the particular resin and other components under consideration and these may be determined by routine experimentation by those skilled in the art. It is, however, preferred to carry out the mixing and dynamic vulcanization under a dry, inert atmosphere (i.e., one that does not adversely react with the components or otherwise interfere with the hydrosilation cure), such as dry nitrogen, helium or argon.

As noted above, in order to be within the scope of the present invention, the tensile strength or elongation, or both, of the TPSiV elastomer must be at least 25% greater than that of a corresponding simple blend. In this context, the term "simple blend" (or physical blend) denotes a composition wherein the weight proportions of resin (A), base (B), stabilizer (C) and optional compatibilizer (D) are identical to the proportions in the TPSiV, but no cure agents are employed (i.e., either component (E) or (F), or both, are omitted and the gum is therefore not cured). In order to determine if a particular composition meets the above criterion, the tensile strength of the TPSiV is measured on dumbbells having a length of 25.4 mm and a width of 3.2 mm and a typical thickness of 1 to 2 mm, according to ASTM method D 412, at an extension rate of 50 mm/min. At least three such samples are evaluated and the results averaged after removing obvious low readings due to sample inhomogeneity (e.g., such as voids, contamination or inclusions). These values are then compared to the corresponding average tensile and elongation values of a sample prepared from the simple blend composition. When at least a 25% improvement in tensile and/or elongation over the simple blend is not realized there is no benefit derived from the dynamic vulcanization and such TPSiVs are not within the scope of the present invention.

The thermoplastic elastomer prepared by the above described method can then be processed by conventional techniques, such as extrusion, vacuum forming, injection molding, blow molding, overmolding or compression molding. Moreover, these compositions can be re-processed (recycled) with little or no degradation of mechanical properties.

The novel thermoplastic elastomers of the present invention can be used to fabricate wire and cable insulation; vibration and sound dampening components; electrical connectors; automotive and appliance components, such as belts, hoses, air ducts, boots, bellows, gaskets and fuel line components; furniture components; "soft-feel" grips for hand-held devices (e.g., handles for tools); architectural seals; bottle closures; medical devices; sporting goods; and general rubber parts.

EXAMPLES

The following examples are presented to further illustrate the compositions and method of this invention, but are not to be construed as limiting the invention, which is delineated in the appended claims. All parts and percentages in the examples are on a weight basis and all measurements were obtained at about 23° C., unless indicated to the contrary.

Materials

The following materials, listed alphabetically for ease of reference, were employed in the examples.

BASE 1 is a silicone rubber base made from 76.68% PDMS 1, defined infra, 17.6% of a fumed silica having a surface area of about 250 $m^2$/g, 5.7% of a hydroxy-terminated diorganopolysiloxane having an average degree of polymerization (DP) of about 8 and 0.02% of ammonia CATALYST 1 is a 1.5% platinum complex of 1,3-diethenyl-1,1,3,3-tetramethyldisiloxane; 6% tetramethyldivinyldisiloxane; 92% dimethylvinyl ended polydimethylsiloxane and 0.5% dimethylcyclopolysiloxanes having 6 or greater dimethylsiloxane units.

COMPATIBILIZER 1 is an epoxypropoxypropyl-terminated polydimethylsiloxane having a number average molecular weight of 900-1,100 and marketed under the trade name DMS-E12 by Gelest, Tullytown, Pa.

COMPATIBILIZER 2 is an (epoxypropoxypropyl) methylsiloxane-dimethyl siloxane copolymer having a number average molecular weight of 8,300 and marketed under the trade name-GP32 by Genesee Polymer Corp, Flint Mich.

NYLON 1 is Rilsan™ Besno TL a polyamide 11 polymer (nylon 11) marketed by Atofina (Elf AtoChem), Birdsboro, Pa. The material was used as provided from newly opened containers, otherwise material was dried for 4 hours at 80° C. under nitrogen flow.

NYLON 2 is Rilsan™ BMNO a polyamide 11 polymer (nylon 11) marketed Atofina (Elf AtoChem), Birdsboro, Pa. The material was used as provided from newly opened containers, otherwise material was dried for 4 hours at 80° C. under nitrogen flow.

PDMS 1 is a gum consisting of 99.81 wt % $Me_2SiO$ units, 0.16% MeViSiO units and 0.03% $Me_2ViSiO_{1/2}$ units. Prepared by potassium catalyzed equilibration of cyclic siloxanes wherein the catalyst is neutralized with carbon dioxide. This gum has plasticity of about 150.

STABILIZER 1 is Lowinox™ CA22, a hindered phenol stabilizer marketed by Great Lakes Chemical Corporation, Indianapolis, Ind., and described as 1,1,3-tris(2'-methyl-4'-hydroxy-5'-t-butylphenyl)butane.

X-LINKER 1 is an SiH-functional crosslinker consisting essentially of 68.4% MeHSiO units, 28.1% $Me_2SiO$ units and 3.5% $Me_3SiO_{1/2}$ units and has a viscosity of approximately 29 mPa-s. This corresponds to the average formula $MD_{16}D'_{39}M$, in which where M is $(CH_3)_3Si$—O—, D is —$Si(CH_3)_2$—O— and D' is —$Si(H)(CH_3)$—O—.

Example 1

Comparative Example

Mixing was done on a Haake Polylab with a rotor speed of 60 rpm, at 210° C. and with a nitrogen purge (0.5 scfm). The bowl was loaded initially (time=0) with 120.0 g of BASE 1 and after 0.5 minutes, 80 g of NYLON 1 was added and allowed to melt and mix. At 1 minute 1 g of STABILIZER 1 was added to the bowl with mixing. At 2.6 minutes 1.65 g of DMS E12 was added and the torque increased from 1500 mg to 6000 mg. The resulting mixture was then taken out of the bowl and evaluated for tensile strength and elongation according to ASTM D412. The resulting material was cold pressed in a Carver press under 4 tonnes of pressure and then cut into squares ranging from 23 to 25 cm in size and compression molded at 210° C. with a warming/pressing/cooling cycle of 2 minutes/3 minutes/2 minutes. The material was pulled from the press and allowed to stand in a polyethylene bag for 48 hrs before mechanical testing was conducted. Five samples were evaluated at a rate of 50 mm/min using a laser extensometer yielding an average tensile strength of 5.6 MPa and elongation at break of 26.6%.

Example 2

Comparative Example

The same procedures and testing techniques as described for Example 1 were used for this example. The bowl was loaded initially with 120.0 g of BASE 1 and after 0.5 minutes 80.0 g of NYLON 1 was added to the bowl and allowed to melt and mix. At 0.8 minute 2.72 g of a 1:1.6 slurry of STABILIZER 1/COMPATIBILIZER 1 was added to the bowl and allowed to mix. At 3.5 minutes 3.87 g of X-LINKER 1 was added to the bowl and the torque rose immediately from 1000 mg to 2500 mg. After noticing the immediate start of curing 1.60 g of a 1:9 (wt. %) mixture of CATALYST 1/1000 cst Dow Corning 200® Fluid was added to the bowl and the torque continued to increase to 6800 mgs. The resulting composition had an average tensile strength of 8.0 MPa and elongation at break of 40.567%.

Example 3

Comparative Example

The same procedures and testing techniques as described for Example 1 were used for this example. The bowl was loaded initially with 120.0 g of BASE 1 and after 0.5 minutes 80.0 g of NYLON 1 was added to the bowl and allowed to melt and mix. At 1.0 minutes 1.0 g of STABILIZER 1 was added to the bowl and allowed to mix. At 3.1 minutes 33 drops of methyl(tris(methylbutoxy))silane (a cure inhibitor) was added followed by s 3.55 g of X-LINKER 1 to the bowl and the torque rose immediately from 1000 mg to 3500 mg. After noticing the immediate start of curing 2.02 g of of a 1:9 (wt. %) mixture of CATALYST 1/1000 cst Dow Corning 200® Fluid was added to the bowl and the torque continued to increase to 7000 mgs. The resulting composition had an average tensile strength of 7.6 MPa and elongation at break of 56.261%.

Example 4

The same procedures and testing techniques as described for Example 1 were used for this example. The bowl was loaded initially with 120.0 g of BASE 1 and after 0.5 minutes 80.0 g of NYLON 1 was added to the bowl and allowed to melt and mix. At 0.7 minute 1 g of STABILIZER 1 followed by the addition of 1.7 g of COMPATIBILIZER 1. At 3.3 minutes 2.03 g of a 1:9 (wt. %) mixture of CATALYST 1/1000cst Dow Corning 200® (Fluid was added to the bowl to the bowl and there is a slight increase of 200mg to the system. At 4.6 minutes 3.23 g of X-LINKER 1 is added to the bowl and the torque continued to increase to 11500 mgs. The resulting composition had an average tensile strength of 13.5 MPa and elongation at break of 158.104%.

Example 5

Comparative Example

The same procedures and testing techniques as described for Example 1 were used for this example. The bowl was loaded initially with 120.0 g of BASE 1 and after 0.5 minutes 80.0 g of NYLON 2 was added to the bowl and allowed to melt and mix. At 0.8 minute 2.65 g of a 1:1.6 slurry of STABILIZER 1 and COMPATIBILIZER 2 was added to the bowl and allowed to mix. At 2.0 minutes 2.40 g of X-LINKER 1 was added to the bowl to the bowl and the torque rose immediately from 1000 mg to 3000 mg and then at 4.6 minutes 1.05 g of additional crosslinker was added for a total of 3.7 g. At 6.2 minutes 0.80 g of a 1:9 (wt. %) mixture of CATALYST 1/1000 cst Dow Corning 200® Fluid was added to the bowl and the torque continued to increase to 4900 mgs. The resulting composition had an average tensile strength of 5.8 MPa and elongation at break of 31.16%.

Example 6

The same procedures and testing techniques as described for Example 1 were used for this example. The bowl was loaded initially with 120.0 g of BASE 1 and after 0.5 minutes 80.0 g of NYLON 2 was added to the bowl and allowed to melt and mix. At 0.8 minute 1.05 g of STABILIZER 1 was added to the bowl and allowed to mix. At 2.0 minutes 2.23 g of a 1:4 (wt. %) mixture of CATALYST 1/1000 cst Dow Corning 200® (Fluid was added to the bowl to the bowl and the torque remained stable at 3.9 minutes 3.75 g of X-LINKER 1 was added to the bowl and the torque rose to 9000 mgs. The resulting composition had an average tensile strength of 9.2 MPa and elongation at break of 62.993%.

We claim:

1. A method for preparing a thermoplastic elastomer comprising:
    (I) first mixing;
        (A) a polyamide resin having a melting point or glass transition temperature of 25° C. to 275° C., wherein the polyamide is nylon 11,
        (B) a silicone base comprising,
            (B') 100 parts by weight of a diorganopolysiloxane gum having a plasticity of at least 30 and having an average of at least 2 alkenyl radicals in its molecule and, optionally,
            (B") 5 to 200 parts by weight of a reinforcing filler, the weight ratio of the silicone base to the polyamide resin is from 35:65 to 85:15,
        (C) 0.1 to 5 parts by weight of a stabilizer for each 100 parts by weight of the polyamide and the silicone base, and optionally,
        (D) 0.1 to 10 parts of a compatibilizer for each 100 parts by weight of the polyamide resin, then;
    (II) adding
        (E) a hydrosilation catalyst, and subsequently,
        (F) an organohydrido silicon compound which contains an average of at least 2 silicon-bonded hydrogen groups in its molecule and components (E) and (F) being present in an amount sufficient to cure the diorganopolysiloxane (B'); and
    (III) dynamically curing the diorganopolysiloxane (B'), wherein at least one property of the thermoplastic elastomer selected from tensile strength or elongation is at least 25% greater than the respective property for a corresponding simple blend wherein the diorganopolysiloxane is not cured.

2. The method according to claim 1, wherein the weight ratio of the silicone base (B) to the polyamide resin (A) is from 35:65 to 75:25.

3. The method of claim 1 wherein the polyamide is selected from nylon 6, nylon 6/6, nylon 6/12, nylon 11 and nylon 12.

4. The method of claim 1 wherein the diorganopolysiloxane (B') is a gum selected from a copolymer consisting essentially of dimethylsiloxane units and methylvinylsiloxane units and a copolymer consisting essentially of dimethylsiloxane units and methylhexenylsiloxane units and the reinforcing filler (B") is present and is a fumed silica.

5. The method of claim 1 wherein the stabilizer is selected from hindered phenols; thioesters; hindered amines; 2,2'-(1,4-phenylene)bis(4H-3,1-benzoxazin-4-one); and 3,5-di-tert-butyl-4-hydroxybenzoic acid, hexadecyl ester.

6. The method according to claim 5, wherein the hindered phenol is selected from tetrakis(methylene(3,5-di-tert-butyl-4-hydroxy-hydrocinnamate))methane, N,N'-hexamethylenebis(3,5-di-tert-butyl-4-hydroxyhydrocinnamamide) and 1,1,3-tris(2'-methyl-4'-hydroxy-5'-t-butylphenyl)butane, 1,3,5-tris(4-tert-butyl-3-hydroxy-2,6-dimethyl benzyl)-1,3,5-triazine-2,4,6-(1H,3H,5H)-trione, and dilauryl-3,3'-thiodipropionate.

7. The method of claim 1 wherein the compatibilizer is added and is selected from (i) a coupling agent having a molecular weight of less than 800 which contains at least two groups independently selected from ethylenically unsaturated group, epoxy, anhydride, silanol, carboxyl, hydroxyl, alkoxy, having 1 to 20 carbon atoms or oxazoline in its molecule, (ii) a functional diorganopolysiloxane having at least one group selected from epoxy, anhydride, silanol, carboxyl, amine, alkoxy having 1 to 20 carbon atoms or oxazoline in its molecule, or (iii) a copolymer comprising at least one diorganopolysiloxane block and at least one block selected from polyamide, polyether, polyurethane, polyurea, polycarbonate or polyacrylate.

8. The method according to claim 1 wherein the catalyst (E) is a neutralized complex of platinous chloride and divinyltetramethyldisiloxane.

9. The method according to claim 1, wherein the organohydrido silicon component (F) is selected from a polymer consisting essentially of methylhydridosiloxane units and a copolymer consisting essentially of dimethylsiloxane units and methylhydridosiloxane units, having 0.5 to 1.7 weight percent hydrogen bonded to silicon and having a viscosity of 2 to 500 mPa-s at 25° C.

10. The method of claim 2 where the polyamide is nylon 11, the diorganopolysiloxane (B') is a gum selected from a copolymer consisting essentially of dimethylsiloxane units and methylvinylsiloxane units, the reinforcing filler (B") is present and is a fumed silica, the stabilizer (C) is a hindered phenol, the compatibilizer (D) is present and is an epoxy functional diorganopolysiloxane, the catalyst (E) is a neutralized complex of platinous chloride and divinyltetramethyldisiloxane, and the organohydrido silicon component (F) is a copolymer consisting essentially of dimethylsiloxane units and methylhydridosiloxane units, having 0.5 to 1.7 weight percent hydrogen bonded to silicon and having a viscosity of 2 to 500 mPa-s at 25° C.

11. A thermoplastic elastomer prepared by the method of claim 1.

12. A thermoplastic elastomer prepared by the method of claim 10.

* * * * *